(12) United States Patent
Nujo Carrascoza

(10) Patent No.: US 12,013,624 B2
(45) Date of Patent: Jun. 18, 2024

(54) CAMERA MODULE, METHOD FOR PRODUCING A CAMERA MODULE

(71) Applicant: Robert Bosch GmbH, Stuttgart (DE)

(72) Inventor: Joao Fernando Nujo Carrascoza, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 17/995,469

(22) PCT Filed: Jul. 16, 2021

(86) PCT No.: PCT/EP2021/069999
§ 371 (c)(1),
(2) Date: Oct. 4, 2022

(87) PCT Pub. No.: WO2022/028861
PCT Pub. Date: Feb. 10, 2022

(65) Prior Publication Data
US 2023/0176449 A1 Jun. 8, 2023

(30) Foreign Application Priority Data
Aug. 4, 2020 (DE) ............... 10 2020 209 775.5

(51) Int. Cl.
*G03B 17/12* (2021.01)
(52) U.S. Cl.
CPC .................... *G03B 17/12* (2013.01)
(58) Field of Classification Search
None
See application file for complete search history.

(56) References Cited

U.S. PATENT DOCUMENTS

| 4,420,239 | A | 12/1983 | Yasuyuki et al. |
| 11,588,960 | B2* | 2/2023 | Eckert ............... G02B 27/0006 |
| 2007/0236920 | A1* | 10/2007 | Snyder .................... F21V 29/70 |
| | | | 362/157 |
| 2014/0002676 | A1* | 1/2014 | Ning ..................... G03B 17/14 |
| | | | 235/375 |

(Continued)

FOREIGN PATENT DOCUMENTS

JP 2008199835 A 8/2008

OTHER PUBLICATIONS

International Search Report for PCT/EP2021/069999, Issued Oct. 14, 2021.

*Primary Examiner* — Clayton E. LaBalle
*Assistant Examiner* — Diana Hancock
(74) *Attorney, Agent, or Firm* — NORTON ROSE FULBRIGHT US LLP; Gerard A. Messina

(57) ABSTRACT

A camera module including an objective having an electrical interface, and an objective holder having an arrangement for electrically contacting the objective in the region of the electrical interface, the arrangement for electrical contacting being further connected to an electronics system, in particular to a printed circuit board, of the camera module. The arrangement for electrical contacting comprise two contact rings, which have contact springs and which form a first and a second pole and are electrically insulated by an interposed spacer, wherein the two contact rings are mounted movably via the objective holder and the spacer. A method for producing a camera module is also described.

11 Claims, 3 Drawing Sheets

(56) References Cited

U.S. PATENT DOCUMENTS

| | | | |
|---|---|---|---|
| 2015/0229843 A1* | 8/2015 | Shimizu | H04N 23/6812 |
| | | | 348/222.1 |
| 2018/0176431 A1* | 6/2018 | Kim | G02B 27/0006 |
| 2018/0203202 A1 | 7/2018 | Takeshita et al. | |

* cited by examiner

CAMERA MODULE, METHOD FOR PRODUCING A CAMERA MODULE

FIELD

The present invention relates to a camera module. The camera module can be used in particular in the automotive field, for example for monitoring the environment. Alternative fields of use are mobile terminals in the consumer sector and/or professional or scientific applications.

Furthermore, the present invention relates to a method for producing a camera module.

BACKGROUND INFORMATION

A generic camera module comprises an objective with an electrical interface and means for electrically contacting the objective in the region of the electrical interface. Accordingly, the objective can be supplied with electrical energy, for example for operating a lens or objective heating system, with the aid of which fogging and/or icing of a lens, in particular of the front lens, of the objective is to be prevented. Alternatively or additionally, the electrical energy can be used for operating an autofocus device, an active image stabilization system, a variable diaphragm or the like.

Conventional means for electrically contacting a camera objective are plug connectors. With the aid of the plug connectors, a plug connection can be established between the objective and an internal electronics system of the camera module or to an external voltage supply. However, it is difficult to establish a plug connection to an internal electronics system due to the usually very restricted installation space conditions, and therefore it is not suitable for large-scale production. The establishment of a plug connection to an external voltage supply requires an installation space adapted to the camera module. In addition, external contacting is exposed to environmental influences, such as moisture, which can negatively influence the reliability and/or the service life of the camera module.

Another problem with electrical contacting is that when the camera module is mounted, the objective has to be not only electrically contacted, but also aligned with respect to an image sensor of the camera module. This occurs, for example, via an "active alignment," wherein the objective is aligned with the image sensor via five axes. After the alignment, the objective position is fixed via a curing adhesive. The electrical contacting of the objective must thus be able to compensate for the movements of the objective via five axes during alignment. This is made possible by, for example, spring contacts. However, these generally lead to an impermissible load on the adhesive used for fixing, since it can absorb only small forces until fully cured.

An object of the present invention is therefore to specify electrical contacting of an objective of a camera module which is as low in force as possible and is also able to compensate for the movements of the objective during "active alignment."

To achieve the object, a camera module and a method are provided. Advantageous example embodiments of the present invention are disclosed herein.

SUMMARY

A camera module according to an example embodiment of the present invention comprises an objective having an electrical interface, and an objective holder having means (i.e., an arrangement) for electrically contacting the objective in the region of the electrical interface, the means for electrical contacting being further connected to an electronics system, in particular to a printed circuit board, of the camera module. According to the present invention, the means for electrical contacting comprise two contact rings, which have contact springs and which form a first and a second pole and are electrically insulated by an interposed spacer. The two contact rings are mounted movably via the objective holder and the spacer.

Although the electrical contacting of the objective in the camera module of the present invention is brought about by means of contact springs, this contacting is low in force. This is because the contact springs are arranged on movably mounted contact rings so that the objective movements can be compensated for via movements of the contact rings. For this purpose, the spring force of the contact springs is preferably set such that, when the objective is moved, the contact springs are as far as possible not deformed, but only or primarily the contact rings are moved.

In addition, the contact rings of the means for electrical contacting according to an example embodiment of the present invention each have multiple contact springs which are distributed as uniformly as possible over the inner circumference of the relevant contact ring, preferably at the same angular distance from one another, so that the objective is loaded over its outer circumference not on one side, but evenly. This is possible because the contact rings, including their contact springs, each form one of the two poles of the electrical contact. The two poles of the electrical contact are accordingly arranged at an axial distance from one another via the spacer rather than at an angular distance from one another as is otherwise usual.

According to a preferred example embodiment of the present invention, the electrical interface comprises two contact tracks which are arranged on the outer circumference of the objective and oppose the contact rings at an annular gap between the objective and the objective holder. This means that a contact track is assigned to each contact ring or each pole. The annular gap is bridged by the contact springs of the contact rings, so that said springs bear against the contact tracks under preloading. When the objective is aligned, the preloading ensures the contact of the contact springs with the contact tracks.

Furthermore, according to an example embodiment of the present invention, it is provided that the contact rings are supported on the objective holder resiliently in the axial direction via contact legs which are angled at their free end. The resilient support allows movements of the contact rings in the axial direction, hereinafter referred to as the z direction. At the same time, the resilient support ensures that the contact rings are held securely on the objective holder during a movement. The contact legs are preferably each arranged radially on the outside of the contact rings and extend from the relevant contact ring in the axial or in the z direction. The angled end portions of the contact legs preferably extend radially outward and engage behind the objective holder.

In a development of the present invention, it is provided that the contact legs contact conductor tracks arranged on the objective holder. The connection to the electronics, in particular to the printed circuit board, of the camera module can be established directly or indirectly via the conductor tracks. The contact legs are preferably contacted with the conductor tracks via the angled free ends, via which the contact legs are supported resiliently on the objective holder. This means that the region of the support and of the contact coincide. This ensures that the contact of the contact legs with the conductor tracks is maintained independently of a movement of the two contact rings.

According to an example embodiment of the present invention, the conductor tracks are preferably arranged in a plane on an underside of a shoulder of the objective holder. This arrangement makes it possible for the angled free ends of the contact legs of the two contact rings to engage behind the objective holder, so that the contact rings on the one hand are held securely on the objective holder and on the other hand can still move relative to the objective holder and the spacer. The objective holder, the contact rings and the spacer can thus be preassembled and installed as a preassembled assembly.

According to an example embodiment of the present invention, it is further provided that the conductor tracks run in a circular arc shape, so that as large an area as possible is created for supporting and contacting the contact legs of the two contact rings. Preferably, the two circular arc-shaped conductor tracks lie opposite one another at an opening of the objective holder for receiving the objective. At the same time, the contact legs can be guided onto the conductor tracks via the opening. The circular arc-shaped profile of the conductor tracks extends in each case over an angle range which is less than 180°, so that the conductor tracks are electrically insulated from one another. This is because each conductor track is assigned to one contact ring, that is to say to one pole. In order nevertheless to be able to support all contact legs of a contact ring on the objective holder resiliently in the axial direction, the circular arc-shaped profile of a conductor track can be interrupted in regions. This region can be used to support a contact leg of a contact ring which forms the respective other pole. The contact legs of a contact ring can thus be arranged at the same angular distance from one another on the relevant contact ring, so that the latter is supported optimally.

Furthermore, according to an example embodiment of the present invention, it is provided that the conductor tracks are each connected to the electronics system, in particular to the printed circuit board of the camera module, via a contact element, which is preferably angled. With the aid of the contact elements, an axial distance between the conductor tracks and the electronics system or printed circuit board can thus be bridged. In the case of an angled configuration of the contact elements, a radial distance can be bridged at the same time.

In order to achieve the object mentioned at the outset, a method for producing a camera module having an objective, an objective holder and an image sensor is also provided. According to an example embodiment of the present invention, in the method, the objective is inserted into the objective holder, electrically contacted and aligned with respect to the image sensor while maintaining the electrical contact. According to the present invention, the objective is electrically contacted via contact springs of two movably mounted contact rings which are electrically insulated from one another, so that movements of the objective during alignment with respect to the image sensor are compensated for via movements of the contact rings.

According to an example embodiment of the present invention, the movable mounting of the two contact rings contributes to low-force electrical contacting of the objective and at the same time permits compensation for the objective movements during alignment. To allow alignment of the objective via five axes, the movable mounting is preferably designed such that each of the rings can be moved in all three spatial directions, i.e. in the x, y and z directions.

For electrical contacting, the objective can have an electrical interface on the outer circumference, said interface consisting, for example, of two circumferential contact tracks, so that the contact springs of the two contact rings can be brought to bear against said tracks.

One contact track on the objective is preferably assigned to each contact ring with the associated contact springs. This is because a pole of the electrical contact is formed via each contact ring with the associated contact springs. This is possible because the two contact rings are electrically insulated via the interposed spacer. For this purpose, the spacer is made of an electrically insulating material, for example made of plastic. Preferably, an annular spacer is used.

Further preferably, according to an example embodiment of the present invention, the contact rings are mounted movably via the objective holder and the spacer element. This means that the contact rings are movable relative to the objective holder and relative to the spacer. The two contact rings can thus also be moved independently of one another.

Advantageously, according to an example embodiment of the present invention, the objective holder, the contact rings and the spacer are preassembled and installed as a preassembled assembly. The contact rings can be held on the objective holder by means of contact legs which are angled at their free end and are supported on the objective holder resiliently in the axial direction or in the z direction. The contact rings are thus held securely on the one hand, and are still movable in all three spatial directions, i.e. in the x, y and z directions, on the other hand. The spacer is held via the contact rings.

The provided method is suitable for producing the above-described camera module according to the present invention. The connection of the contact rings to an electronics system, in particular to a printed circuit board, of the camera module can accordingly be carried out analogously to the connection of the previously described camera module.

A preferred embodiment of the present invention is explained in more detail below with reference to the figures.

DETAILED DESCRIPTION OF EXAMPLE EMBODIMENTS

Figure 1:
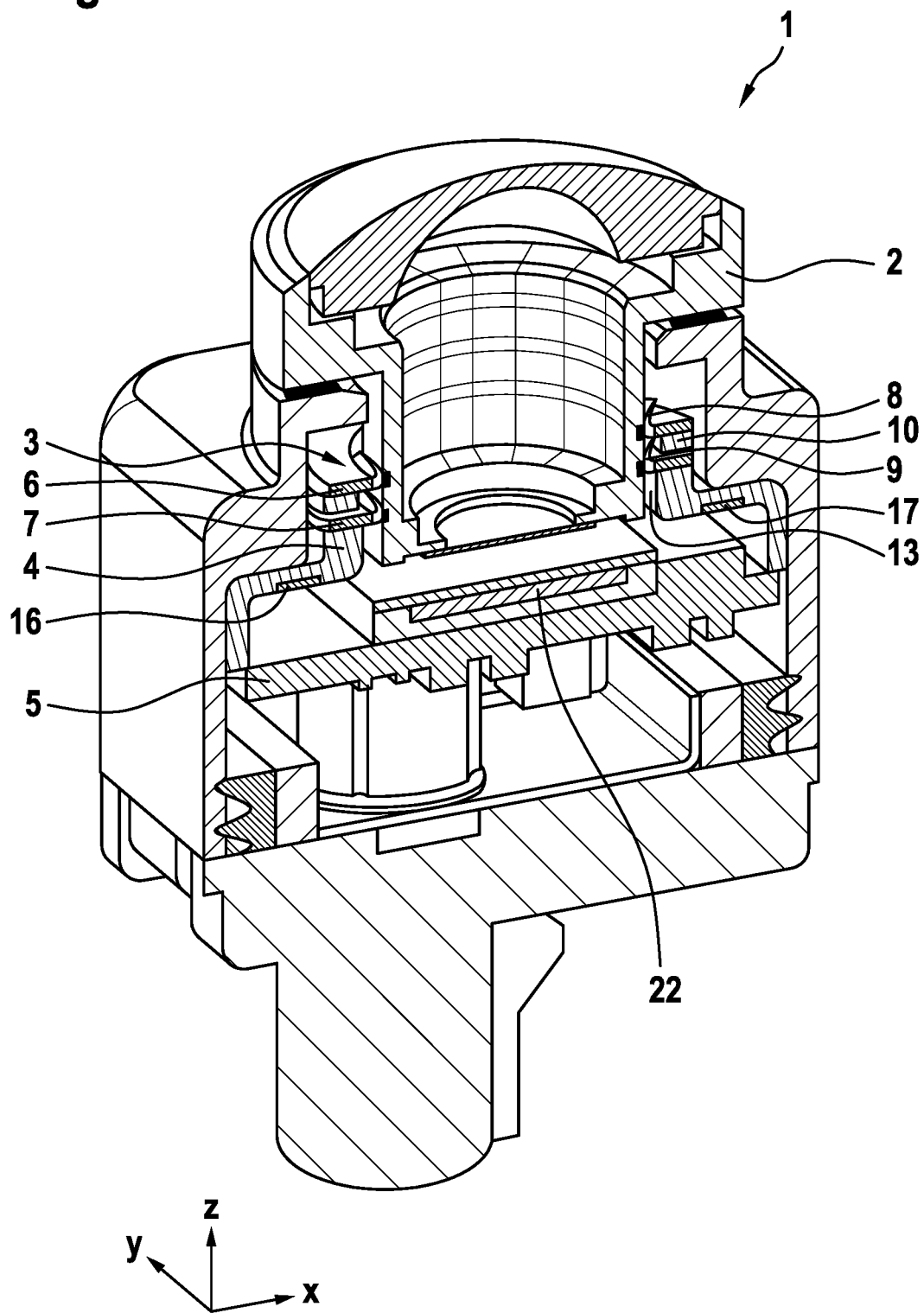
FIG. 1 shows a sectional view through a camera module according to an example embodiment of the present invention.

The camera module 1 according to an example embodiment of the present invention shown in FIG. 1 comprises an objective 2, an objective holder 4 and an image sensor 22. During production of the camera module 1, in particular during assembly, the objective 2 must be electrically contacted and aligned with respect to the image sensor 22. This requires electrical contacting which allows and compensates for the objective movements required for alignment, so that the electrical contact is maintained.

Figure 2:
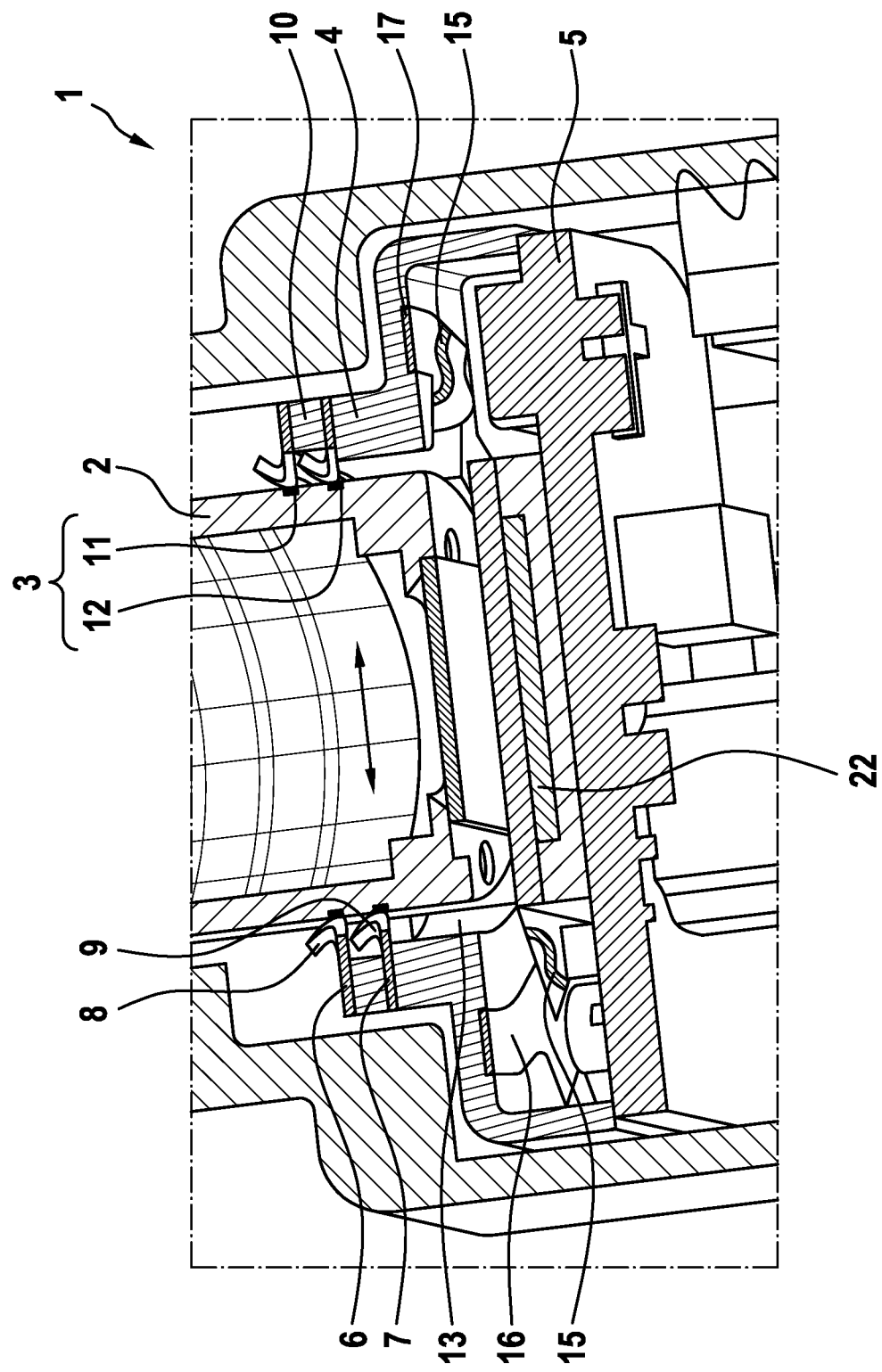
FIG. 2 shows an enlarged detail of FIG. 1.

For this purpose, the camera module 1 shown has an objective holder 4 which comprises means (i.e., an arrangement) for electrically contacting the objective 2 in the region of an electrical interface 3. In the present case, the electrical interface 3 is formed by two circumferential contact tracks 11, 12 arranged on the outer circumference of the objective 2 (see FIG. 2). The means for contacting the electrical interface 3 formed on the objective 2 comprise two contact rings 6, 7, which are movably mounted and have contact springs 8, 9 that bridge an annular gap 13 between the objective holder 4 and the objective 2 and bear against the contact tracks 11, 12 of the objective 2 under preloading. Each contact ring 6, 7 forms a pole of the electrical contact, so that a separate contact track 11, 12 is assigned to each contact ring 6, 7. The two contact rings 6, 7 are additionally electrically insulated via an interposed annular spacer 10.

Figure 3:
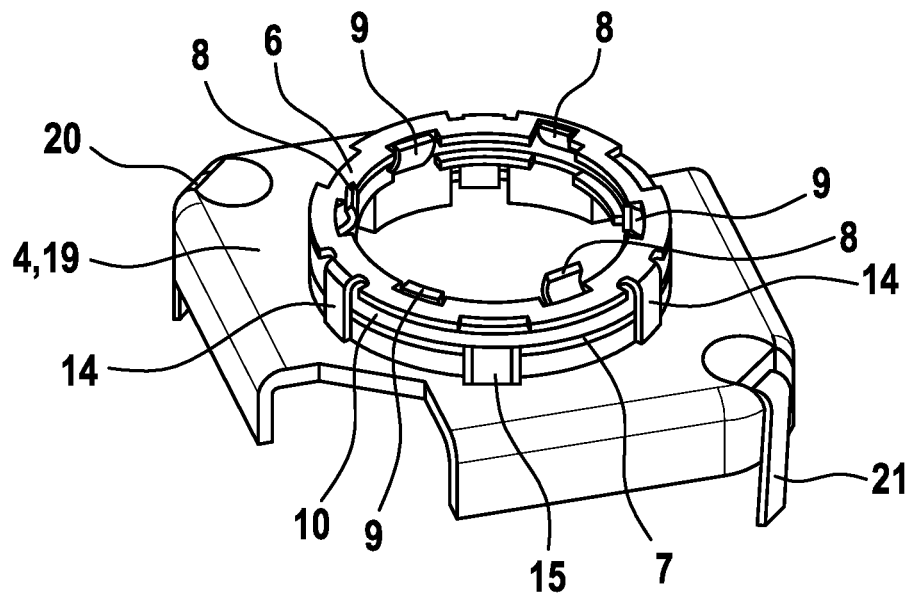
FIG. 3 shows a perspective view of the objective holder of the camera module of FIG. 1 from obliquely above, including the means for electrically contacting the objective.

In order to connect the contact rings 6, 7 to an electronics system or to a printed circuit board 5 of the camera module 1, the contact rings 6, 7 each have contact legs 14, 15 that act radially on the outside. In the present case, each contact ring 6, 7 has three contact springs 8, 9 arranged at the same angular distance from one another and three contact legs 14, 15 arranged at the same angular distance from one another, wherein the angular position of the contact legs 14, 15 of a contact ring 6, 7 is offset from the angular position of the associated contact springs 8, 9 by half an angular distance (see FIGS. 3 and 4). The same applies in relation to the angular position of the contact legs 14 of a first contact ring 6 relative to the angular position of the contact legs 15 of a second contact ring 7.

The contact legs 14, 15 are angled at the end, so that they engage under a shoulder 19 of the objective holder 4. Accordingly, they bear against an underside 18 of the shoulder 19 (see FIGS. 2 and 4). On the underside 18, the shoulder 19 has conductor tracks 16, 17, which run in a circular arc shape, so that in each case two contact legs 14, 15 of one contact ring 6, 7 contact one conductor track 16, 17 (see FIG. 4). In order to prevent contact between the conductor track 16, 17 and a contact leg 14, 15 of the other pole, the circular arc-shaped profile of the conductor tracks 16, 17 is in each case interrupted in the region of this one contact leg 14, 15. Since the conductor tracks 16, 17 also extend only over an angular range which is less than 180°, they are also electrically insulated from one another via the objective holder 4.

Figure 4:
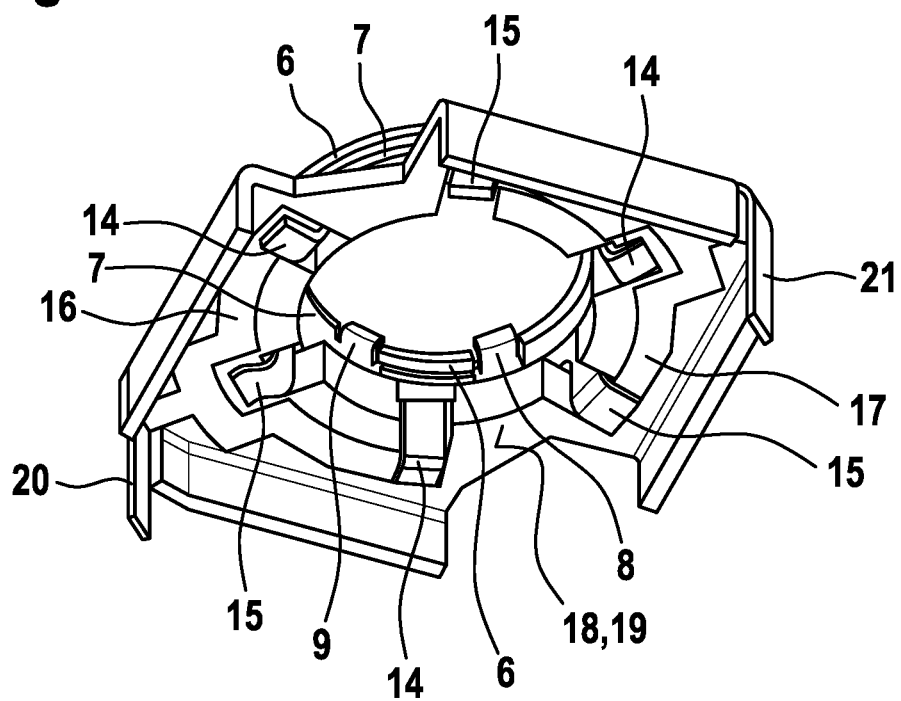
FIG. 4 shows a perspective view of the objective holder of FIG. 3 from obliquely below.

The two conductor tracks 16, 17 are in turn connected to the printed circuit board 5 of the camera module 1 via contact elements 20, 21, which in the present case are flag-like and are diametrically opposite one another on the objective holder 4 (see FIG. 4).

The invention claimed is:

1. A camera module, comprising:
an objective having an electrical interface; and
and an objective holder having an arrangement configured to electrically contact the objective in a region of the electrical interface, the arrangement configured to electrically contact being further connected to an electronics system including a printed circuit board of the camera module;
wherein the arrangement configured to electrically contact includes two contact rings which have contact springs and which form a first and a second pole and are electrically insulated by an interposed spacer, and wherein the two contact rings are mounted movably via the objective holder and the spacer.

2. The camera module according to claim 1, wherein the electrical interface includes two contact tracks which are arranged on an outer circumference of the objective and oppose the contact rings at an annular gap between the objective and the objective holder, wherein the annular gap is bridged by the contact springs of the contact rings, so that the contact springs bear against the contact tracks under preloading.

3. The camera module according to claim 1, wherein the contact rings are supported on the objective holder resiliently in an axial direction via contact legs which are angled at their free end.

4. The camera module according to claim 3, wherein the contact legs contact conductor tracks arranged on the objective holder.

5. The camera module according to claim 4, wherein the conductor tracks are: (i) arranged in a plane on an underside of a shoulder of the objective holder and/or (ii) run in a circular arc shape.

6. The camera module according to claim 4, wherein the conductor tracks are each connected to the printed circuit board of the camera module, via a contact element.

7. The camera module according to claim 6, wherein the contact element is angled.

8. A method for producing a camera module having an objective, an objective holder, and an image sensor, the method comprising:
inserting the objective into the objective holder, electrically contacted and aligned with respect to the image sensor while maintaining the electrical contact, wherein the objective is electrically contacted via contact springs of two movably mounted contact rings which are electrically insulated from one another, so that movements of the objective during alignment with respect to the image sensor are compensated for via movements of the contact rings.

9. The method according to claim 8, wherein a pole of the electrical contact is formed via each contact ring with the associated contact springs.

10. The method according to claim 8, wherein the contact rings are mounted movably via the objective holder and the spacer element.

11. The method according to claim 8, wherein the objective holder, the contact rings, and the spacer are preassembled and installed as a preassembled assembly.

* * * * *